M. W. MIX.
LAMINATED WHEEL FILLER UNIT.
APPLICATION FILED JAN. 31, 1916.
1,336,254.
Patented Apr. 6, 1920.
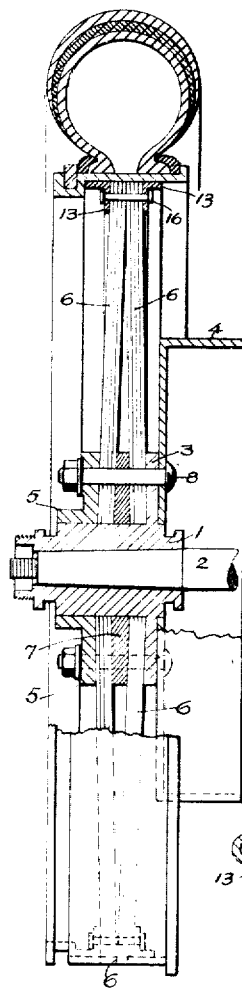
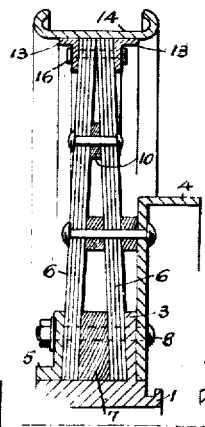
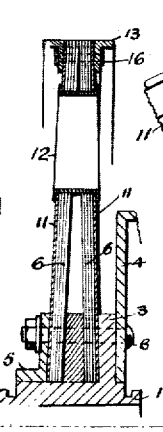
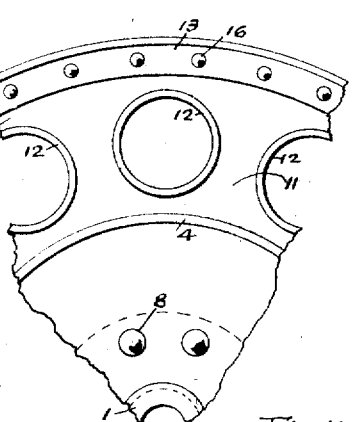
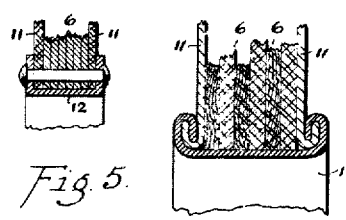
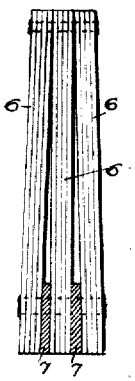
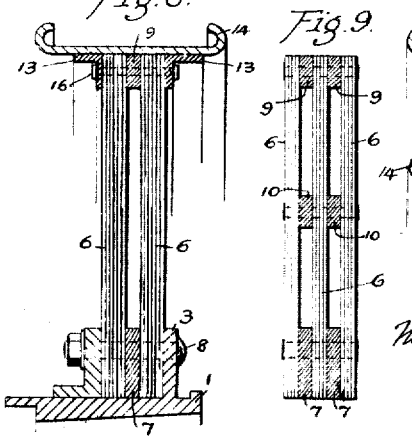
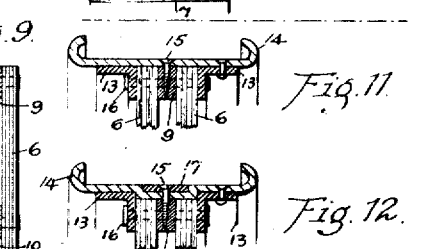
WITNESSES:
Melville W. Mix INVENTOR.
BY H. S. Amstutz
ATTORNEY

UNITED STATES PATENT OFFICE.

MELVILLE W. MIX, OF MISHAWAKA, INDIANA, ASSIGNOR TO DODGE MANUFACTURING COMPANY, OF MISHAWAKA, INDIANA, A CORPORATION OF INDIANA.

LAMINATED WHEEL FILLER UNIT.

1,336,254.  Specification of Letters Patent.  Patented Apr. 6, 1920.

Application filed January 31, 1916. Serial No. 75,350.

*To all whom it may concern:*

Be it known that I, MELVILLE W. MIX, a citizen of the United States, residing at Mishawaka, in the county of St. Joseph and State of Indiana, have invented certain new and useful Improvements in Laminated Wheel Filler Units, of which the following is a specification.

My invention relates to improvements in laminated wheel filler units and it appertains more especially to the features pointed out in the annexed claims.

The purpose of my invention is to provide laminated wheel filler units for motor cars, auto trucks and similar or other uses which shall be of light weight and great rigidity without sacrificing elasticity and resiliency; that are easily assembled; economical to construct; and most efficient in service. In addition, it is also the purpose to provide laminar wheel fillers made up as independent units, for use with any desired type of tire rims, wheel hubs, etc., such units in their various forms being adapted to the different conditions found in actual practice.

With these and other ends in view I illustrate in the accompanying drawing such instances of adaptation as will disclose the broad features without limiting myself to the specific details shown.

Figure 1 instances an elevation partly in section of an assembled laminar wheel for detachable tires adapted to either a demountable or clencher type of tire, also showing the laminations divided into two groups.

Fig. 2 also instances an elevation in section of groups of laminar units reinforced with distance blocks between the hub and rim for trussing purposes.

Fig. 3 shows a cross section in elevation of a metallic sheathed wheel with stiffening thimbles inserted into openings formed to make the wheel lighter and more graceful.

Fig. 4 is a side elevation of Fig. 3.

Fig. 5 shows the thimble held by rivets.

Fig. 6 shows the thimble spun into the metal casing sheets.

Fig. 7 is an elevation in section of an adaptation in which the groups of a filler unit are curved with respect to each other so as to put them under tension.

Fig. 8 instances in a sectional elevation the disposition of the groups for heavier service.

Fig. 9 is a diagrammatic elevation showing heavy groups reinforced between the rim and hub.

Fig. 10 is a diagrammatic elevation of inclined groups on each side of a straight center.

Fig. 11 instances a means for additionally holding the rim to filler units.

Fig. 12 shows an amplification of Fig. 11.

In these adaptations laminated filler units are used as substitutes for the usual fellies or rims and spokes. In the assembled exemplification of Fig. 1, a built in unit is shown in connection with a rear wheel of an automobile, with the usual brake drum attached. These filler units are of course equally adaptable to the front axles of vehicles or as fillers for non-split pulleys on machine tools, etc. It is immaterial whether the laminations comprise the natural fibers of wood angularly displaced in the different layers, or artificially made materials having a grain more extended in one direction than another.

It is immaterial as to what means for attaching the laminations to the hub, brake drum or rim are used, or whether the laminations are grouped one way or another. Whatever special features the exigencies of practice and the specialized needs of various lines of industry demand, these are included in the present invention, regardless of the extent of such variations or how the component parts of the units are held together. As instanced in Figs. 1, 2, 3, 7 and 10 the groups are spread more at the hub than at the rim. In Figs. 8, 9, 11 and 12 they are placed parallel to each other.

Any suitable form of wheel hub 1 may be used. If the wheel is a driving one the hub is held on the tapering axle 2 in the usual manner. A flange 3 serves as an abutment to the inner group of laminations, and if required the brake drum 4 may be attached to it. A flanged ring 5 slides on the outside of the hub and by means of bolts clamps the laminated filler to the flange 3. When the groups of laminæ 6 are spread at the hub suitable distance blocks 7 or annular rings are placed therebetween, bolts 8 passing through the same the filler unit and flanges, holding all in assembled relation.

The rim edge of the groups of circularly formed laminations 6 may abut each other or separators 9 may be placed between them. In addition, separators 10 may be used between the hub opening and rim to truss them. Should these be made of gradually lessening thickness as the rim is approached the groups will be inclined to each other and if of uniform thickness they will be parallel. Suitable rivets or bolts may pass through these separators to hold the parts as a unit in close relation.

In the formation of laminar unit wheel fillers I do not limit myself to the use of distance blocks, separators, etc., in all cases. In certain adaptations, dependent on the kind of service to which the wheels are subject, the laminations may be placed side by side in parallel relation to each other, and for purposes in which heavy side strains are encountered they are grouped and trussed. The exemplifications shown in the drawings are adaptable as independent laminar units, assemblable with any desired type of rim or hub. Fig. 9 instances parallel groups of laminæ with separators between them, while the other figures show groups in trussed relation to each other. Whatever the specific arrangement of the groups, so long as they constitute independent units the structure comes within the spirit of my invention, regardless of the specific fastening means by which they are secured to hubs or the exact way in which tire rim flanges, etc., are secured to the units, or how the groups of laminæ are fastened to each other so as to be held together while being handled.

When the wheel filler units comprising groups 6 are perforated by holes as in Fig. 4 the outer side of each group may have a steel sheath 11 assembled with it. If the holes instanced in Fig. 4 were left unlined the end fibers of the laminæ would be exposed to dampness, rain, etc., and in order to avoid this a thimble 12 is spun in as shown in Fig. 3, riveted in as shown in Fig. 5 or crimped into place to make a water proof joint as instanced in Fig. 6. Metallic sheaths may also be applied to any of the groups shown. If it is desired to place the groups under tension with respect to each other they may be curved as shown in Fig. 7.

The structure shown in Fig. 4 forms an independent unit which may be attached to various types of hubs or rims to constitute finished wheels, the component parts being complete units made independently of each other and adapted to be manufactured in quantities as separate articles to be later assembled by independent purchasers in any desired combination.

Around the outer edge of the fillers 6 suitable annular flanges 13 may be attached to the rims 14 by suitable rivets or any other desired manner. In case the rim 14 is formed in one piece, one of the flanges 13 would be riveted or bolted to it and the other spot welded as instanced in Figs. 11 and 12 or both flanges might be riveted to the rim. The riveting of one flange is necessitated on account of assembling the filler units comprising groups 6, flanges 13 and rim 14. If desired flat headed counter sunk screws 15 may be placed between rivets 16, so as to enter separators 9. Separators, 9, 10 and 7 may be made in the form of rings so as to facilitate the assembling of filler units.

In making laminated wheel filler units they are formed independently of any type of rims. Either one of the forms shown, the one in Fig. 1 and that designated by 14 on Figs. 2, 8, 11 and 12, or any other style may be used. In any event the filler units are easily attachable to hubs and rims so as to facilitate the manufacture of composite wheels by using such units in any desired combination. In case of accidents in which wheels are injured it is extremely important to quickly substitute a new unit for the damaged one, somewhat similar, in facility and ease of change, to the well known types of demountable rims on spoked motor car wheels.

To secure this advantage wheel rims will have one of the angles 13, Figs. 11 and 12, spot welded to it or permanently secured in any other way. The other angle may be held by removable fastenings of any desired kind. The use of a rim similar to the one exemplified in Fig. 1 would be an equivalent of rim 14, shown in Figs. 11 and 12, and may be substituted therefor. In such a substitution the upturned edge of rim 14 on one side is replaced by a removable flanged tire ring, and the holding ring shown in Fig. 1 substituted therefor, thus making the tire detachable, without reference to the rim itself, which may be quite independently removed from the fillers without disturbing the tire on the rim.

Whenever it is desired to more accurately aline the angles 13 with respect to rim 14 and a filler unit, an open ended or split ring 17 shown in Fig. 12 may be secured in a groove, formed in rim 14', by means of screws 15. In forming the outside groove for the ring 17 two shoulders are produced on the inside of the rim 14', Fig. 12, against which the angles 13 abut. These shoulders and the ring 17 with its screws 15 passing into a central separator of a filler unit very materially reinforce a completely assembled wheel against side strains.

This structure is only shown as an exemplification and is not to be construed as limiting my invention to it or to any practical equivalents thereof. It is made the subject of separate prosecution. Other expedients could be instanced but as these do not constitute the broad features of my present invention they are not shown or specially claimed in this instance.

It will be seen that plywood wheel filler embodying the features instanced or their substantial equivalent are simple, economical to manufacture, of light weight and long life.

What I claim is,

1. In laminar wheel fillers a plurality of laminated disks arranged in groups spaced apart, metallic sheaths on the outside of the disks having openings in register with openings formed in the disks, means extending through both openings to hold the sheaths in position on the disks, and means placed in the interspace between the groups to hold such groups apart within the limits set by the thimbles.

2. In independent wheel fillers, attachable laminar filler members comprising a plurality of groups of laminated disks spaced apart to form trussed elements to more effectively resist side strains, metallic sheaths on the exterior of each filler member, and means for holding the parts in assembled relation independently of various types of rims and hubs with which the units may be combined so as to form a standardized product adaptable to the varying requirements of different kinds of service.

In testimony whereof I affix my signature in presence of two witnesses.

MELVILLE W. MIX.

Witnesses:
 CHAS. ENDLICH,
 A. W. ZIMMERMAN.